Oct. 1, 1929.  H. RUSBY  1,729,899
SHAFT COUPLING
Filed May 3, 1927

WITNESSES:
A. J. Schiefelbein.
W. D. O'Connor

INVENTOR
Hermann Rusby.
BY Wesley G. Carr
ATTORNEY

Patented Oct. 1, 1929

1,729,899

UNITED STATES PATENT OFFICE

HERMANN RUSBY, OF STOCKSBRIDGE, NEAR SHEFFIELD, ENGLAND, ASSIGNOR TO WESTINGHOUSE ELECTRIC & MANUFACTURING COMPANY, A CORPORATION OF PENNSYLVANIA

SHAFT COUPLING

Application filed May 3, 1927, Serial No. 188,446, and in Great Britain May 13, 1926.

My invention relates to couplings for shafts or other rotary members which, in normal operation, are arranged substantially co-axial, provision being made for lateral displacements of the shafts or members in a plane perpendicular to the axes of rotation, and, in some instances, also for longitudinal displacements thereof.

In the patent to George H. Fletcher and Hermann Rusby, Number 1,633,935, issued June 28, 1927, and assigned to the Westinghouse Electric and Manufacturing Company is described an improved form of coupling of this character comprising a pair of links connected by universal joints at opposite ends respectively, with cranks on a shaft journalled on, and transversely of, the axis of one of the members to be coupled and with the other member to be coupled.

My present invention provides a simplified construction and, in accordance therewith, the links are dispensed with, and the cranks on the tranverse shaft carried by one of the members to be coupled are pivotally engaged directly in the other member to be coupled. The arrangement is such that the cranks can partake of a transverse component of movement substantially parallel to the axis of the shaft and a component of sliding movement relative to at least one of the rotary members and parallel to the axis of said member.

Preferably, the ends of the cranks remote from the journalled portion of the shaft are spherically seated in slippers in the adjacent rotary member, said slipper being slidable axially in said members, and the transverse movement may be obtained by guiding said slippers with freedom of movement in a transverse direction. The invention also permits a convenient construction and arrangement of the parts to ensure the exclusion of foreign matter and to facilitate lubrication, adjustment or repair.

Figure 1:
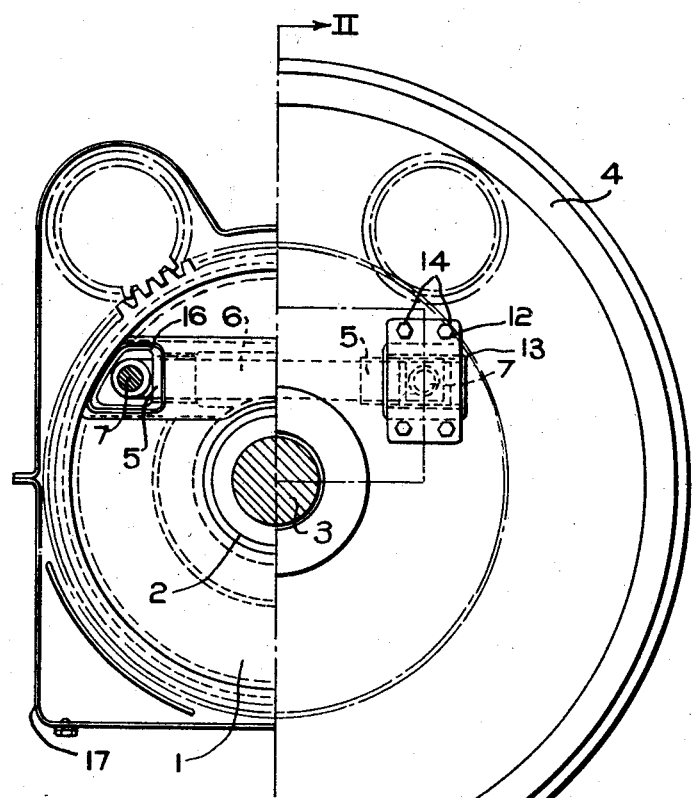

Although capable of more general application, my invention is particularly adapted for transmitting torque from a driving motor to the track wheels of a locomotive and, in order that it may be clearly understood, an example is hereinafter described with reference to the accompanying drawings, wherein, Figure 1 is a composite view showing, on the right-hand side an elevation of the track wheel and, on the left-hand side, a section taken substantially on the line I—I of Fig. 2.

Figure 2:
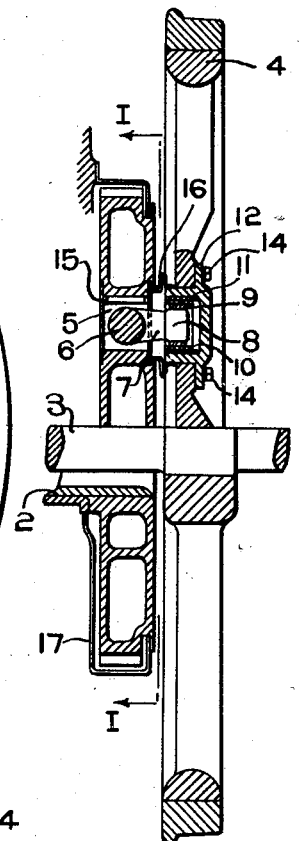
Figure 3:
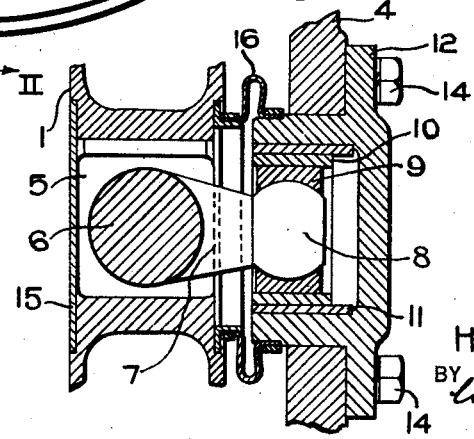

Fig. 2 is a view in cross-section, taken substantially on the line II—II of Fig. 1, and Fig. 3 is an enlarged fragmentary view of the shaft and crank mechanism shown in Fig. 2.

In the example shown in the drawings, the driving motor of a locomotive is connected, through suitable gearing, to a gear wheel 1 mounted on a quill shaft 2 that is normally concentric with the axle 3 of a track wheel 4 of the locomotive. Recessed in the gear wheel 1 are a pair of bearings 5 in which is journalled a traverse shaft 6 that carries at its opposite ends, two parallel cranks 7.

The cranks 7 terminate in spherical portions 8 which engage correspondingly shaped bearing portions 9 in rectangular slippers 10 that are adapted to slide in guides 11 secured in brackets 12 that are removably mounted on the track wheel 4. The guides 11 are so dimensioned as to permit the slippers to move both axially and transversely of the track wheel. The guides 11 and bracket members 12 may be formed in one piece, but, by providing guides constituting detachable liners for the bracket members 12 as shown, they may be readily repaired or adjusted in case of need.

With the device described above, if the quill shaft 2 is resiliently mounted in the usual manner in the locomotive frame and the locomotive is in motion, variations in the relative positions of the axes of the quill shaft 2 and of the track wheel axle 3 will take place continually. The torque, however, will be transmitted from the gear wheel 1 to the track wheel 4 through the intermediary of the shaft 6, the cranks 7 and the slippers 10, the slippers 10 sliding axially or transversely in order to accommodate themselves to the relative motion between the gear wheel 1 and the track wheel 4 regardless of whether such motion results in variations of eccentricity, inclination, or axial displacement of the two wheels, within a limited compass.

It is evident that the construction of the coupling may be varied, for example, by mounting the shaft 6 to slide axially or transversely of the gear wheel 1 instead of or in addition to, the sliding of the slippers 10 and similar results obtained. It is further immaterial whether the transverse shaft 6 is mounted in the gear wheel 1 or in the track wheel 4 and from which of the parts connected by the coupling the torque is transmitted. It is manifest that the coupling is suitable for use where the driving and driven shafts are normally somewhat eccentric or inclined at a comparatively small angle to each other.

The moving parts of the above described mechanism may be totally enclosed for the purpose of excluding dust or other foreign matter and for retaining a supply of lubricant. This is effected by making the brackets 12 of the guides 11 of channel section, with longitudinal flanges at opposite sides and providing end plates 13 that are inserted into openings formed in the track wheel 4 from the side of the latter remote from the gear wheel, the brackets 12 being secured in position by bolts 14. Cover plates 15 are placed over the bearings 5 for the transverse shaft 6 at the side of the gear wheel 1 remote from the track wheel 4 and the central portions of the cranks 7 are enclosed by flexible tubes 16 extending between the opposed faces of the gear wheel 1 and the track wheel 4, said tubes 16 being conveniently attached, at one end, to the brackets 12. A gear case 17 may also be provided to enclose the gear wheel 1 and its driving pinions, and the gear case may serve as an oil sump.

The simple form of coupling above described admits of various modifications within the scope of the invention. For example, the shaft and crank mechanism may be duplicated, thereby increasing the capacity of the coupling for transmitting power, and, if symmetrically disposed, the system will be inherently balanced without the aid of additional compensating weights. The system may also be balanced when only a single transverse shaft is employed by disposing said shaft diametrically of the member on which it is mounted, in which event, the shaft is preferably formed to embrace the quill shaft or running axle with sufficient clearance to permit of the necessary working motion.

If desired, a certain degree of resilience may be introduced in the coupling, for example, by the interposition of springs between suitable portions of the coupled member, as has been described in the above mentioned co-pending application or in any other convenient manner.

Although I have described a specific embodiment of my invention, it will be obvious to those skilled in the art that various modifications may be made in the details of construction and in the arrangement of the several cooperating parts without departing from the spirit and scope of my invention as defined in the appended claims.

I claim as my invention:

1. A coupling comprising a pair of cooperating members to be coupled, a shaft journalled in one of said members, a plurality of cranks on said shaft and universal sliding connecting means for connecting said cranks to the other co-operating member.

2. A coupling comprising a pair of co-operating members to be coupled, a shaft journalled in one of said members, a plurality of cranks on said shaft and means comprising sliding blocks for connecting said cranks to the other co-operating member.

3. A coupling comprising a pair of co-operating members to be coupled, a shaft journalled in one of said members, a plurality of cranks on said shaft and means slidably mounted in the other co-operating member for universally engaging said cranks.

4. A coupling comprising a pair of co-operating members to be coupled, a shaft journalled in one of said members transversely to the axis thereof, a crank on each end of said shaft and means in the other co-operating member for universally engaging the ends of said cranks.

5. A coupling comprising a pair of co-operating members to be coupled, a shaft journalled in one of said members transversely to the axis thereof, a crank on each end of said shaft and slippers slidably mounted in the other co-operating member for universally engaging the ends of said cranks.

6. A coupling comprising a pair of co-operating members to be coupled, a shaft journalled in one of said members transversely to the axis thereof, a crank on each end of said shaft and slippers mounted in the other co-operating member for universally engaging the ends of said cranks, said slippers being slidable parallel to the axis of said member.

7. A coupling comprising a pair of co-operating members to be coupled, a shaft journalled in one of said members transversely to the axis thereof, a crank on each end of said shaft and slippers mounted in the other cooperating member for universally engaging the ends of said cranks, said slippers being slidable transversely to the axis of said member.

8. A coupling comprising a pair of co-operating members to be coupled, a shaft journalled in one of said members transversely to the axis thereof, a crank on each end of said shaft and slippers mounted in the other cooperating member for universally engaging the ends of said cranks, said slippers being slidable parallel and transversely to the axis of said member.

9. A coupling comprising a pair of co-operating members to be coupled, a shaft journalled in one of said members transversely to the axis thereof, a plurality of cranks on said shaft and universal joint and sliding connecting means between said cranks and the other co-operating member.

10. A coupling comprising a pair of co-operating members to be coupled, a shaft journalled in one of said members transversely to the axis thereof, a plurality of cranks on said shaft said cranks having sliding universal engagement with the other co-operating member.

11. A coupling for rotary members, comprising a shaft journalled in one of said members to be coupled transversely of the axis thereof and cranks secured on said shaft said cranks having spherically shaped ends remote from the journaled portion of the shaft for co-operating with slippers slidably mounted in the other rotary member.

12. A coupling for rotary members, comprising a shaft journalled in one of the members to be coupled, cranks secured on said shaft and pivotally engaged directly in the other member to be coupled in such manner that said cranks can partake of a transverse component of movement parallel to the axis of the shaft and a component of sliding movement relative to at least one of the rotary members and parallel to the axis thereof.

13. In a locomotive-driven mechanism, the combination with an axle, a track wheel mounted on said axle, a driving quill shaft normally concentric with said axle and a driven gear-wheel mounted on said quill shaft, of a shaft journalled transversely in said gear-wheel, a crank mounted on each end of said shaft said cranks being provided with spherical portions at their ends remote from the shaft, rectangular slippers having correspondingly shaped bearing portions for engaging said crank ends, removable brackets on said track wheel, and guides in said brackets for slidably engaging said slippers to permit them to move both axially and transversely of the track wheel.

14. A flexible coupling comprising a rotatable element having a member rotatably supported thereon with the axis of rotation of the latter extending transversely of the former, another rotatable element having openings therein, a plurality of links directly connected to said member and extending into the openings in said last mentioned rotatable element so as to form a driving connection therewith.

In testimony whereof, I have hereunto subscribed my name this 14th day of April, 1927.

HERMANN RUSBY.